(12) United States Patent
Xu et al.

(10) Patent No.: US 10,655,265 B2
(45) Date of Patent: May 19, 2020

(54) WASHING MACHINE AND CONTROL METHOD THEREFOR

(71) Applicant: QINGDAO HAIER WASHING MACHINE CO., LTD., Laoshan, Qingdao (CN)

(72) Inventors: Sheng Xu, Qingdao (CN); Jinzhu Deng, Qingdao (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 651 days.

(21) Appl. No.: 15/309,081

(22) PCT Filed: Jul. 2, 2014

(86) PCT No.: PCT/CN2014/081454
§ 371 (c)(1),
(2) Date: Nov. 4, 2016

(87) PCT Pub. No.: WO2015/168983
PCT Pub. Date: Nov. 12, 2015

(65) Prior Publication Data
US 2017/0073878 A1 Mar. 16, 2017

(30) Foreign Application Priority Data
May 8, 2014 (CN) .......................... 2014 1 0192501

(51) Int. Cl.
*D06F 39/00* (2020.01)
*D06F 39/08* (2006.01)
*D06F 39/10* (2006.01)

(52) U.S. Cl.
CPC .......... *D06F 39/088* (2013.01); *D06F 39/006* (2013.01); *D06F 39/08* (2013.01);
(Continued)

(58) Field of Classification Search
CPC ...... D06F 39/006; D06F 39/08; D06F 39/083; D06F 39/088; D06F 39/10; Y02B 46/56; Y02B 40/56
(Continued)

(56) References Cited

FOREIGN PATENT DOCUMENTS

| CN | 1341562 A | 3/2002 |
| CN | 2514892 Y | 10/2002 |

(Continued)

OTHER PUBLICATIONS

Ikemizu et al., "JP2001054700A English Machine Translation.pdf", Feb. 27, 2001—Machine translation from Espacenet.com.*
(Continued)

*Primary Examiner* — Levon J Shahinian
(74) *Attorney, Agent, or Firm* — Buchanan Ingersoll & Rooney PC (57) ABSTRACT

A washing machine comprises a water-containing barrel, a flocculation container and a filtering container that are successively brought into communication in a loop; the flocculation container is provided with a stirring mechanism and a washing mechanism; a rotatable filtering mechanism and a filtering and self-washing mechanism using water intake current to spray and clean the filtering mechanism are provided in the filtering container. When the washing ends, water is discharged into the flocculation container, and after the flocculation processing, the water is discharged into the water-containing barrel of the washing machine for rinsing after being filtered by the filtering container, and the processing procedure is circulated until the rinsing is completed; during the last rinsing processing, the flocculation generated in the circulated water flocculation processing is controlled to be discharged and the rinsing is completed.

10 Claims, 4 Drawing Sheets

(52) U.S. Cl.
CPC ............ *D06F 39/083* (2013.01); *D06F 39/10* (2013.01); *Y02B 40/56* (2013.01)

(58) Field of Classification Search
USPC .................... 8/158, 159; 68/13 R, 17 R, 207
See application file for complete search history.

(56) References Cited

FOREIGN PATENT DOCUMENTS

| | | |
|---|---|---|
| CN | 2639369 Y | 9/2004 |
| CN | 1566454 A | 1/2005 |
| CN | 1673123 A | 9/2005 |
| CN | 201258412 Y | 6/2009 |
| CN | 201390906 Y | 1/2010 |
| CN | 101748581 A | 6/2010 |
| CN | 202860901 U | 4/2013 |
| CN | 203411822 U | 1/2014 |
| EP | 3 034 676 A1 | 6/2016 |
| JP | 2001-54700 A | 2/2001 |
| JP | 2001113090 A | 4/2001 |
| JP | 2001149691 A | 6/2001 |
| JP | 2002-119794 A | 4/2002 |
| JP | 2006085214 A | 3/2006 |
| WO | 2015143785 A1 | 10/2015 |

OTHER PUBLICATIONS

The extended European Search Report dated Feb. 1, 2017, by the European Patent Office in corresponding European Patent Application No. 14891284.3-1710. (6 pages).

International Search Report (PCT/ISA/210) dated Feb. 11, 2015, by the State Intellectual Property Office of the P.R. China as the International Searching Authority for International Application No. PCT/CN2014/081454.

Written Opinion (PCT/ISA/237) dated Feb. 11, 2015, by the State Intellectual Property Office of the P.R. as the International Searching Authority for International Application No. PCT/CN2014/081454.

Extended European Search Report dated Feb. 1, 2017 in corresponding European Patent Application No. 14891284.3-1710, 6 pages.

First Examination Report dated Aug. 21, 2019 in corresponding Indian Patent Application No. 201627038482 with English Translation, 6 pages.

Office Action (Notification of Reasons for Refusal) dated Jan. 12, 2018 in corresponding Japanese Patent Application No. 2016-563821, 3 pages.

First Office Action dated Jun. 5, 2018 in corresponding Chinese Patent Application No. 201410192501.4 with English Translation, 15 pages.

\* cited by examiner

WASHING MACHINE AND CONTROL METHOD THEREFOR

FIELD OF THE INVENTION

The present invention relates generally to the field of washing machines, and particularly to a circulated water-saving washing machine and a control method, and more particularly to a washing machine with a circulated water treatment function by flocculating and filtering and a control method.

BACKGROUND OF THE INVENTION

With improvement of people's living standard, the washing machine has become one of main household appliances in people's daily life, the washing process of the washing machine mainly includes washing, rinsing and spin-dry stages, in the washing stage, water and detergent flood in the washing machine to wash clothes, after the washing machine enters the rinsing stage, in order to rinse stains and residual detergents, it is necessary to take in more water or perform more rinsing times to rinse the clothes, this will definitely consume a large number of water resources, even if it is a water-saving roller washing machine, in order to clean the clothes, the clothes needs to be rinsed at least twice, and such a process will at least consume more than 30 L of running water. Sometimes, there are fewer stains on the clothes or fewer detergents are dispensed into, the clothes may be clean after twice-rinsing, however, as the user selects 3-times rinsing, it will definitely cause a waste of water resources, for example, generally, during twice-rinsing of a 6 Kg full automatic washing machine, about 100 L of water is basically used. How to save water and electricity while the clothes is cleaned is always one of the focuses of consumers.

So far, a water purification and recycling device used in conjunction with a household washing machine has not yet appeared, even if the so-called washing machine with a water saving function, a water storage tank is generally mounted to a side position of the washing position, and a water pump is used for injecting water and draining water, which generally can inject water once and rinse the clothes three times, to play a role of saving water. However, the water after washing cannot be stored; at the same time, the structure of the washing machine is complicated and large, which is not conductive to transportation, recycling and so on. Due to limitations in the volume, structure, flexibility and other aspects, full play of the original function of the washing machine and the function of the water saving tank is affected. On the basis of the existing washing modes, in order to better save the water resources, many manufacturers have invested a lot of research and development.

The existing washing machine has a circulated water function, which merely plays a role of filtering threads, washing evenly or adding ozone, heavy metal ion sterilization and the like. The amount of water consumed cannot be improved, and the cleaning is not improved at all.

Regarding recycling of the laundry water, upon reference, for example, as disclosed in Chinese Patent Application No. 200810072420.5, entitled "water saving device for recycled water of washing machine", the laundry water is dispensed into a water drum for purification treatment. In the invention, the first-pass laundry water is directly drained away without purification, and the second-pass and third-pass rinse water, after purification treatment, is left for use in next washing.

In the above technology, the "circulated water technology" is used after the rinse water is purified, the technology cannot recycle the first-pass laundry water (rough cleaning water), and the purified water should be left for use in next washing, but cannot be used in the current washing.

Existing flocculation water treatment technology is mostly used in industry with large equipment which requirements are more stringent, especially in water treatment. However, a washing machine for washing clothes only need to deal with detergent and other washing additives, there is no need to spend a lot of money directly shrinking the existing large scale equipment. Therefore, it is necessary to develop a kind of flocculation treatment water equipment which can reduce the cost and can realize the recycling of washing water. In addition, in order to maintain flocculation treatment of water equipment hygiene also need to be cleaned.

In view of the foregoing, the present invention is proposed.

SUMMARY OF THE INVENTION

A technical problem to be solved in the present invention is to provide a method for controlling water circulation and processing in a washing machine by using flocculation filtration technology, so as to overcome the shortcomings of the prior art.

Another objective of the present invention is to provide a control method for the washing machine narrated above.

To solve the foregoing technical problem, the basic concept of the technical solution adopted by the present invention is: a control method in a washing machine having a circulated water treatment function comprising, discharging water into a flocculation container when the washing ends, and after a flocculation treatment, filtering water by a filtering container, and then discharging water into a water containing drum of the washing machine for rinsing, and circulating repeatedly foregoing processing procedure until the rinsing is completed, wherein, during last rinsing processing, a flocculation generated in the flocculation treatment for circulated water is controlled to be discharged, and after the rinsing is completed, rinsing water is used to wash the flocculation container.

Further, the waste water is discharged into the filtering container and discharged by the filtering container after cleaning the flocculation container.

Further, the rinsing water completes cleaning the flocculation container, and tap water is inflooded to clean the filtering container.

Further, a procedure of flocculation processing for water comprises, first putting a quantitative flocculant and then inflooding tap water to flush the quantitative flocculant into the flocculation container, setting stirring time and static time, stratifying, draining water in a lower layer which contains less flocculation into the filtering container, and accumulating the flocculation which is in an upper layer in the flocculation container until the last rinse is completed, and discharging the flocculation.

Further, during the circulating water treatment process, if the flocculation detected in the flocculation container exceeds an upper limit of a set value, the flocculation treatment is finished first, and a next flocculation water treatment is carried out after discharging the flocculation.

Further, keep stirring while discharging flocculation until the discharge ends when discharging the flocculation.

Further, it is determined whether need to add water or not according to comparison between a detected water level and a set water level after draining treated water into the water containing drum each time.

Further, according to an amount of detergent, an amount of water intake for washing, and an amount of water in each flocculation treatment, a dose of the flocculant is calculated for the water to be processed by the flocculation treatment.

Further, after the stratification, water in the lower layer containing less flocculation is discharged into the filtering container; a discharge time is fixed by a setting amount, or calculated according to the dose of the flocculant and the amount of water in the flocculation treatment, or measured according to the turbidity.

The washing machine in the present invention comprises a water containing drum, a flocculation container and a filtering container, and the water containing drum, the flocculation container, the filtering container and then the water containing drum are successively brought into communication in a loop by pipeline.

The flocculation container is provided with a stirring mechanism which stirs to accelerate dissolution of the flocculant and a cleaning mechanism for flushing an inner wall of the flocculation container.

The filtering container is provided with a rotatable filtering mechanism and a filtering self-cleaning mechanism which is used for spraying and cleaning the filtering mechanism through a water flow.

The filtering container is provided with a filtering outfall communicated with the water containing drum and a drain outlet for discharging washing water, the flocculation container connects with the filtering container, the cleaning water for cleaning the flocculation container is drained into the filtering container and discharged through the drain outlet of the filtering container.

Further, the stirring mechanism comprises a stirring motor which is mounted on an external of the flocculation container, a stirring shaft which extends to an inner of the flocculation container and a stirring impeller mounted on the stirring shaft. The cleaning mechanism comprises a water throwing impeller which throws water onto the inner wall of the flocculation container, and the water throwing impeller is coaxially mounted on the stirring shaft.

The stirring impeller is mounted on a bottom end of the stirring shaft, and the water throwing impeller is mounted on the stirring shaft near the stirring motor. When inflooding water to clean the flocculation container, the stirring motor drives the water throwing impeller to rotate at a high speed. Due to the centrifugal force acting on the water throwing impeller, the water is thrown onto the inner wall of the flocculation container for cleaning at a certain speed. In order to expand the range of water injection, the stirring motor is programmed to operate at different stages of speed.

Further, a bending direction of the stirring impeller is opposite to a rotation direction of the stirring shaft in the stirring process.

Further, the flocculation container is provided with a guiding gutter for guiding water onto the water throwing impeller.

Further, the flocculation container is provided with a filtering water inlet, a flocculant inlet and a water outlet. The filtering water inlet of the filtering container is communicated with the water containing drum, and the water outlet of the flocculation container is communicated with the filtering water inlet of the filtering container, and the water outlet of the flocculation container acts as also the outlet which drains flocculating water to the filtering container and the outlet which drains cleaning water to the filtering container.

Further, the filtering mechanism comprises a tube-shaped filtering barrel and a filter screen arranged on the filter barrel. Two ends of the filtering barrel are pivotally connected to the filtering container, wherein one end of the filtering barrel is a rotary joint, and the other end of the shaft seal.

Further, an inclined angle $\alpha$ is provided between an axial direction of the filtering mechanism and a horizontal plane, which $0 \leq \alpha \leq 30°$.

Further, the filtering container is provided with a filtering water inlet connected with the flocculation container, the filtering outfall which discharges filtered water through the filtering outfall, and the drain outlet for discharging waste washing water to the outside, the filtering outfall is communicated with the rotary joint of the filtering mechanism.

Further, the filtering self-cleaning mechanism comprises a nozzle mounted on the filtering container, and a water spraying direction acts on the surface of the filtering mechanism and drives the filtering mechanism to rotate.

Further, the filtering self-cleaning mechanism comprises a blade mounted on the surface of the filter barrel, and the blade is arranged corresponding to the water spraying direction of the nozzle, so as to transfer the power of the water flow to drive the filtering barrel to rotate.

Further, the washing machine in the present invention comprises a flocculant quantitative automatic dispensing device. The flocculant is automatically put in the corresponding proportion depending on the amount of washing water and the turbidity of the washing/rinsing water at each flocculation treatment. If the flocculant is flake, the existing automatically dispensing structure for flake detergent can be used; if the flocculant is granule or powder, then the existing technology structure is used for the quantitative delivery.

After the foregoing technical solution is adopted, the present invention has the following beneficial effects compared with the prior art.

1. Both the flocculation and filtration containers are achieved to self-cleaning function eliminating the need for manual cleaning, increasing automation, simplifying the structure, and saving production costs.

2. The structure is simple by flushing the inner wall of the flocculating container with inflowing water, and flushing the filtration mechanism with inflowing water.

3. The water for cleaning the flocculation container of the present invention can pre-wash the filtering container in advance through the filtering container, and the secondary washing of the filtering water is carried out for further cleaning, and the cleaning effect is better.

4. The process of discharging the flocculation is synchronized with the final rinsing, which saves time. And it relatively saves water resources to flush the flocculation container with the rinse water.

DETAILED DESCRIPTION OF THE INVENTION

Specific embodiments of the present invention are further described below in detail with reference to the accompanying drawings.

Figure 1:
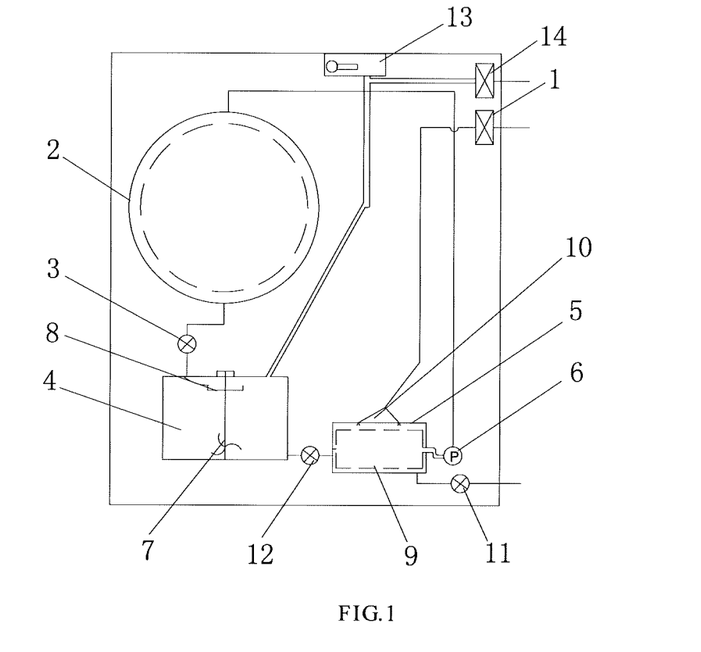
FIG. 1 is a schematic of the washing machine of the present invention.
Figure 2:
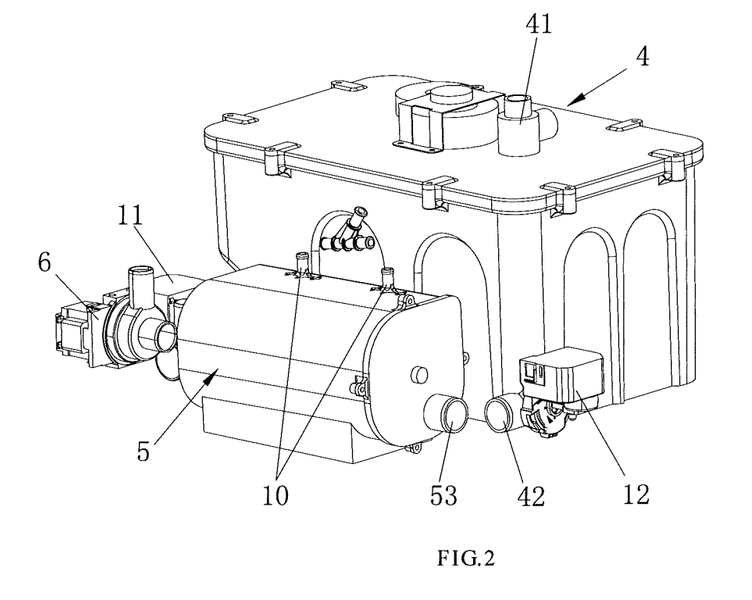
FIG. 2 is a schematic assembling structural diagram of the flocculation container and filtering container of the present invention.

As shown in FIG. 1 and FIG. 2, the washing machine of the present invention includes, but is not limited to, a pulsator washing machine and a drum washing machine. The washing machine needs to have various parts of the ordinary washing machine, which includes a main inlet valve 1, a water containing drum 2 for washing, a computer board for controlling washing, a drive means, a detergent automatic feeding means and a drain valve 3. The present invention makes improvements on the basis the ordinary washing machine, adds a flocculation container 4 in which the washing water is processed by a flocculant and a filtering container 5 that filters water treated by the flocculant, and pipelines which connect the water containing drum 2, the flocculation container 4 and the filtering container 5, and a draining pump 6 which drains treated water back to water containing drum 2. The flocculation container 4 is provided with a stirring mechanism 7 which is used to stir water flow to accelerate the dissolution of flocculant, and a cleaning mechanism 8 which is used to flush and clean the inner wall of the flocculation container. The filtering container is provided with a rotatable filtering mechanism 9 and a filtering self-cleaning mechanism 10 which uses the water flow to spray and clean the filtering mechanism. The filtering container 5 is provided a filtering water outlet 51 which is communicated with the water containing drum 2 and a drain outlet 52 which drains washing water to the outside (referring to FIG. 3). The flocculation container 4 is communicated with filtering container 5, and the washing water for cleaning the flocculation container 4 is discharged through the drain outlet of the filtering container 52 to outside after the washing water is drained into the filtering container 5.

As shown in FIG. 2, the flocculation container 4 is provided with a flocculation water inlet 41 and a flocculation water outlet 42. The flocculation water inlet 41 is communicated with the water containing drum 2 of the washing machine through drainage pipeline and a drain valve 3 is set between the flocculation water inlet and the water containing drum. The filtering container 5 is provided with a filtering water inlet 53 which is comunicated with the flocculation water outlet 42, and a drain valve 11 is provided in the drain outlet 52 of the filtering container. A communication valve 12 is provided between the flocculation water outlet 42 and the filtering water inlet 53. The washing machine of the present invention is further provided with a flocculant quantitative feeding device 13 and a feeding flushing valve 14 (see FIG. 1). The water from the feeding flushing valve 14 flushes quantitatively the flocculant which being thrown in from the flocculant quantitative feeding device 13 into the flocculation container 4.

Figure 8:
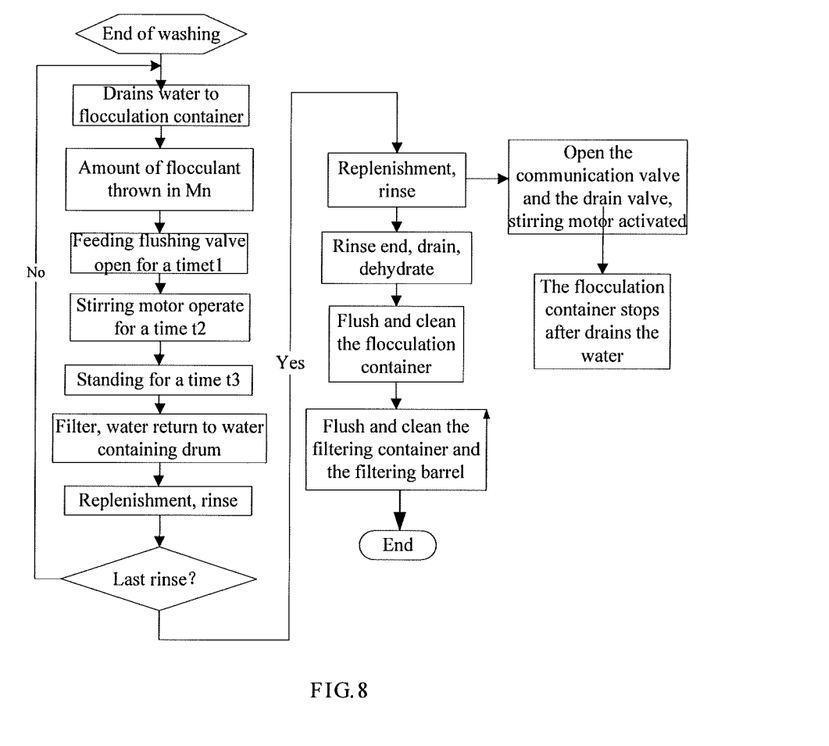
FIG. 8 is a flow diagram of the controlling method of the washing machine of the present invention.

As shown in FIG. 8, after washing process of the washing machine of the present invention is completed, the washing water is controlled to enter the flocculation container 4 by the drain valve 3, and the flocculant quantitative feeding device 13 puts quantitative dosage of M1 flocculant. The dosage of the flocculant M1 is calculated according to the amount of the detergent and the amount of washing water by the computer board of the washing machine. The feeding flushing valve 14 is open for a certain time t1, water flushing the flocculant into the flocculation container 4, wherein t1 and the dosage of the flocculant are related. Then the stirring mechanism 7 operates for a set time t2 which t2 is a fix value. After the flocculation treatment is completed, the flocculation floats after standing for a set time t3, t3 is set according to the flocculation stratification effect and t3 can also be determined according to the turbidity measurement results or a fixed value. Then, the communication valve 12 between the bottom of the flocculation container and the filtering container 5 is opened, and water containing less flocculation in the bottom layer of the flocculation container 4 is discharged into the filtration container 5 and filtered through the filtering mechanism 9. The filtered water is drained through the draining pump 6 back to the water containing drum 2 of the washing machine. Since the filtration rate may be slower than pumping rate of the draining pump, the draining pump 6 may be operated intermittently according to the actual situation.

After the filtered water is discharged to the water containing drum 2 of the washing machine, the communication valve 12 is closed the drain pump 6 is stopped, the and washing machine detects the water level in a washing drum, fills in water and rinses. After the rinsing, the flocculation treatment repeated, wherein the amount of the flocculant is changed to M2, M3, M4 and so forth according to the rinsing times. During the last rinse proceed with a flushing procedure instead of the flocculation treatment. The flushing procedure is divided into three parts: (1) sewage disposal, at the beginning of the last rinse, the communication valve 12 and the drain valve 11 are opened at the same time, and the stirring motor rotates for a duration t4 which t4 is calculated based on the amount of water remaining in the flocculation container 4 and the rate of drainage, or the stirring motor stops until the water level sensing means which installed in the flocculation container 4 detects the end of discharge. (2) Flushing the flocculation container 4, When the drain valve 3 is operated, the stirring mechanism 7 is operated simultaneously, and the communication valve 12 and the drain valve 11 are simultaneously opened; at the end of the discharge, the communication valve 12 is closed, and the drain valve 11 is maintained in the open state. (3) Flushing the filtering container 5. The main inlet valve 1 is open for a duration of t5, 5 second after the flushing, discharging water out of filtering container 5 and the drain valve 11 is closed. The washing procedure ends, and the washing machine programs are all over.

Embodiment 1

The control method for processing circulation water in the washing machine of the present invention comprises: subjecting the washing water of the washing machine to a flocculation treatment and then circulating same for re-use, wherein, according to an amount of detergent dosed, an amount of water intake for washing, and an amount of water in each flocculation treatment, a dose of flocculant is calculated for the water in the flocculation treatment Wherein, according to the amount of clothing, the washing machine chooses the amount of water intake for washing. The amount of water intake can be calculated by detecting the water level with the water level detection means, or can be calculated by influent flow meter and time.

According to the amount of clothing and the dirty degree of clothing, calculates the amount of detergent needed for washing. The dirty degree of clothing is usually chosen by users, the washing machine is provided with corresponding clothes dirty degree of light, medium and heavy three grades, but not limited to three grades, or, the washing machine has the function of automatic detection of dirty degree of clothing, this is an existing technology.

Specific, after washing ends, water is drained water to the flocculation container for flocculation treatment. The amount of water in the flocculation treatment is detected and denoted as L1, the amount of detergent dosed denoted as M, the amount of water intake for washing denoted as L. Because the amount of the flocculant is determined according to the amount of detergent during the flocculation treatment of washing water, when the amount of detergent in the treating water is M, the amount of the flocculant is aM. In the present invention, washing water is transferred to the flocculation container for flocculation treatment, therefore the amount of water changes. According to the amount of water in the flocculation container, the dose of the flocculant is N1=aML1/L, among them, a is constant, which is related to the type of detergent and flocculant. After the flocculation treatment is completed, the treated water is re-drained into the water containing drum for rinsing.

After the first rinsing is completed, water is drained to the flocculation container for a second flocculation treatment. Due to the low concentration of the washing water, the dosage of the flocculant is adjusted according to the amount of water in the second flocculation treatment. The amount of water in the second flocculation treatment is detected and denoted as L2, therefore the dose of flocculant needed for the water to be processed by the second flocculation treatment this time is N2=(aM (L-L1)+bL2 among them, b is constant, which is related to the type of the detergent and flocculant. After the flocculation treatment is completed, the treated water is re-drained into the water containing drum for a second rinsing.

After the second rinsing is completed, water is drained to the flocculation container for a third flocculation treatment, the value of (N1+N2)/aM is calculated and compared with set value t. If the value of (N1+N2)/aM is bigger than t, a fixed dose of the flocculant N3=Nmin is put, otherwise, the fixed dose of flocculant N3=Nmax is put, which Nmax>Nmin, both Nmin and Nmax are a set value.

In general, after washing clothing, the washing machine defaults to rinsing twice. If multiple rinsing is needed, for the i times flocculation treatment which i≥3, the value of $$\frac{\sum_{i=1} Ni}{aM}$$

is calculated, and compared with set value t. If the value is bigger than t, the fixed dose of flocculant Ni=Nmin is put, otherwise, the fixed dose of flocculant Ni=Nmax is put.

Embodiment 2

Figure 6:
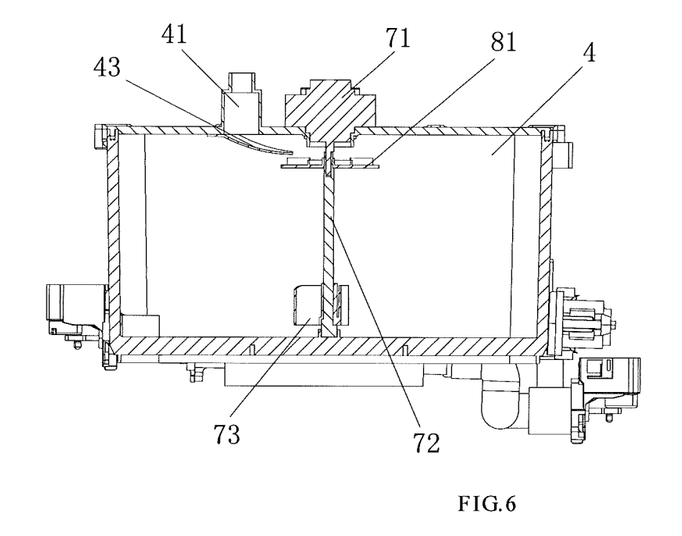
FIG. 6 is a schematic of the flocculation container of the present invention.
Figure 7:
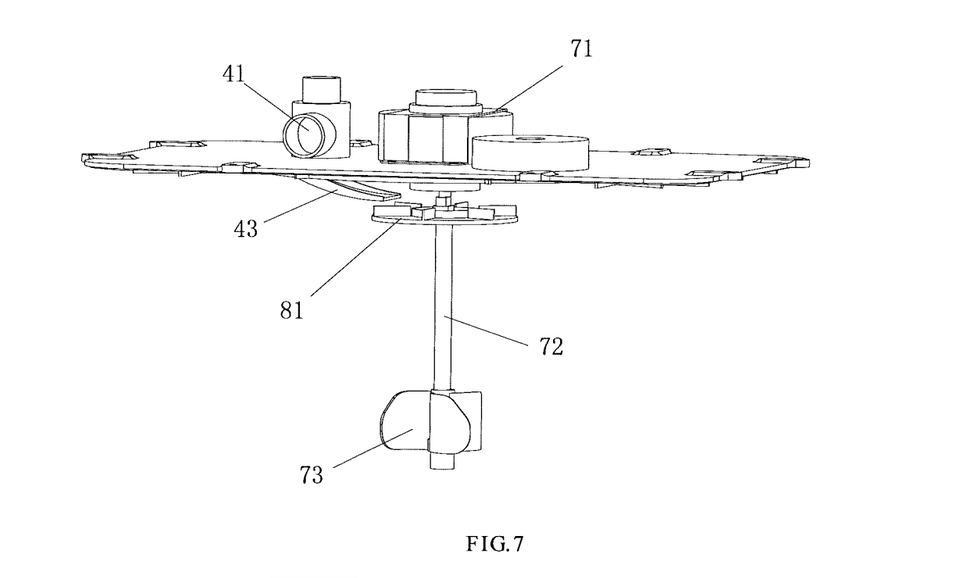
FIG. 7 is a schematic structural diagram of the stirring mechanism and cleaning mechanism of the present invention.

As shown in FIG. 6 and FIG. 7, the stirring mechanism 7 of the present embodiment comprises a stirring motor 7 which is mounted on the external of the flocculation container 4, a stirring shaft 72 which extends to the inner of the flocculation container 4 and a stirring impeller 73 mounted on the stirring shaft 72. The cleaning mechanism 8 comprises a water throwing impeller 81 which throws the water into the inner wall of the flocculation container 4. The water throwing impeller 81 is coaxial mounted on the stirring shaft 72. The flocculation container 4 is provided with a guiding gutter 43 for guiding water from the water inlet 41 of the flocculation container to the water throwing impeller 81. The guiding gutter is not essential, for example, the water inlet 41 is set above the water throwing impeller 81, and the water is directly guided to the water throwing impeller.

A stirring impeller 73 is mounted on the bottom end of the stirring shaft 72, and the water throwing impeller 81 is mounted on the stirring shaft 72 and is close to the stirring motor 71. When using the water to wash the flocculation container 4, the stirring motor 71 drives the water throwing impeller 81 to rotate at high speed. Due to the centrifugal force of the water throwing impeller, the water is thrown onto the inner wall of the flocculation container for cleaning at a certain speed. In order to expand the range of water injection, the stirring motor be programmed to operate at different stages of speed. As such, the water will fall to a different height of the inner wall of the flocculating container.

Embodiment 3

Figure 4:
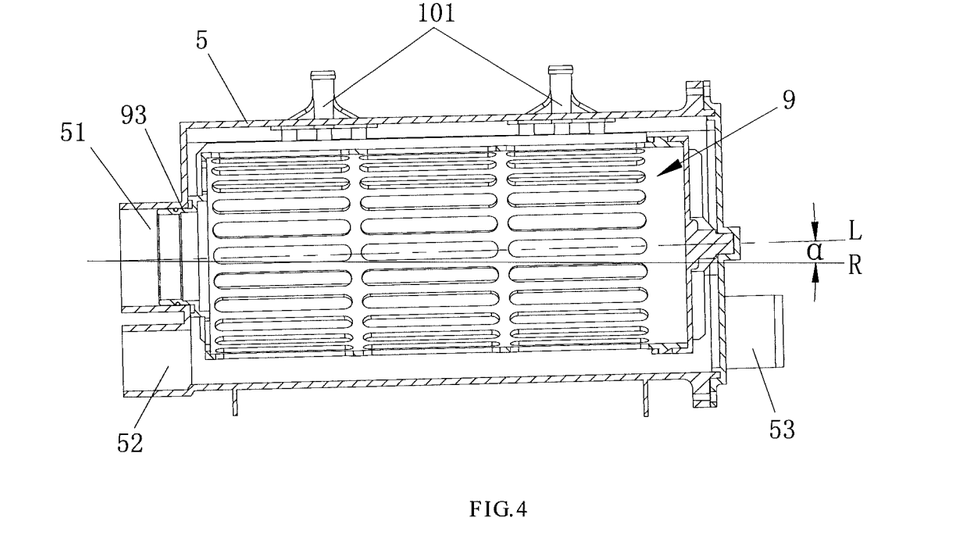
FIG. 4 is an A-A cross-sectional schematic of FIG. 3.
Figure 5:
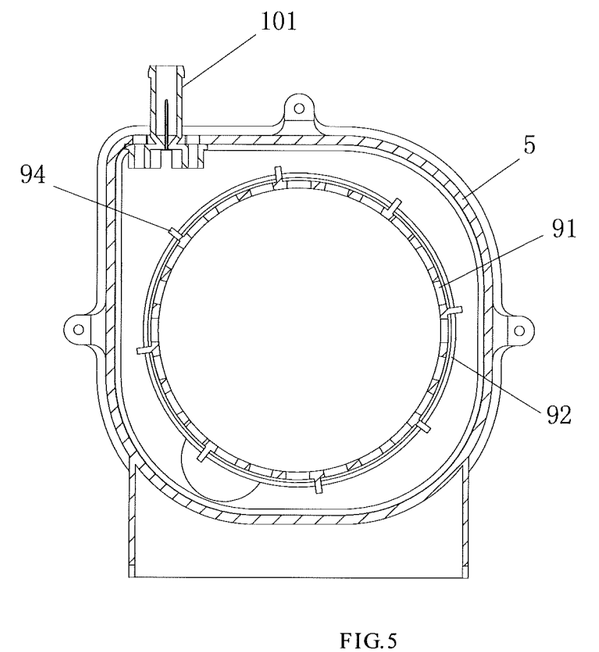
FIG. 5 is a B-B cross-sectional schematic of FIG. 3.

As shown in FIG. 4 and FIG. 5, the filtering mechanism 9 of the present embodiment comprises a filtering barrel 91 and a filter screen 92 arranged on the filter barrel. Both ends of the filtering barrel are pivotally connected with the filter container, wherein one end is a rotatable water outlet 93 which communicated with the filtering water outlet 51 and the other end of the filtering barrel is sealed. The rotational axial direction L of the filter mechanism has an inclination angle α with respect to the horizontal plane R, 0≤α≤30°. By tilting or tapping the filtering mechanism, not only can increase the filter area, speed up the filtration rate, but also conducive to clean the filter screen.

In the present embodiment, the path of the filtered water is, the water treated by the flocculant in the flocculation container 4 flows through the filtering water inlet 52 into the filtering container 5, and flows through the filter screen 92 into the filtering barrel 91, then the water is drained from the rotatable water outlet 93 through the filtering water outlet 51 to the water containing drum 2.

Embodiment 4

Figure 3:
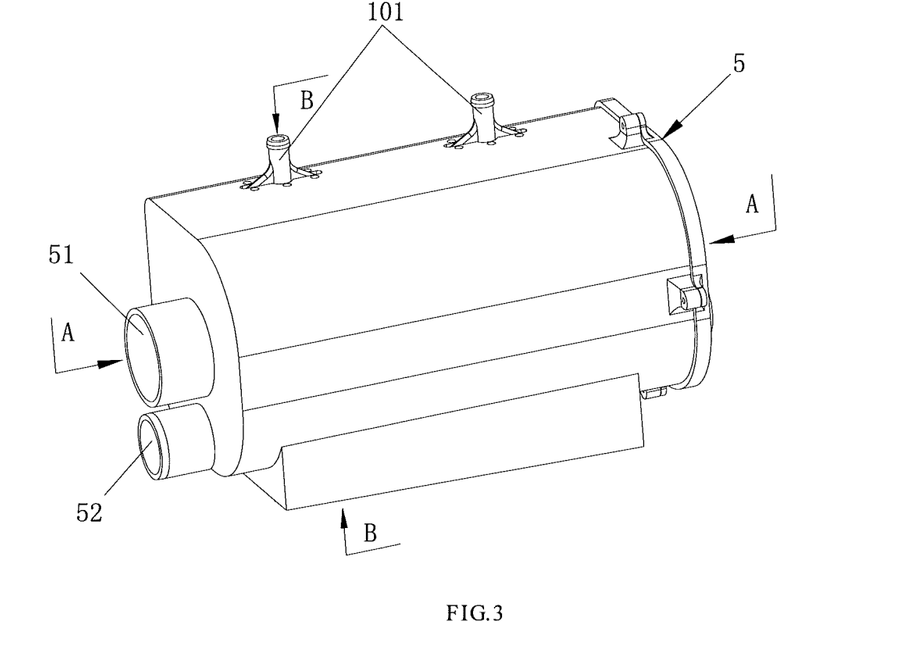
FIG. 3 is a schematic of the filtering container of the present invention.

As shown in from FIG. 3 to FIG. 5, the filtering self-cleaning mechanism 10 of the present embodiment comprises a nozzle 101 mounted on the filtering container 5. A water spraying direction acts on the surface of the filtering mechanism 9 and drives the filtering mechanism 9 to rotate. Meanwhile the water flow can be used to spay cleaning the filter screen 92. The water spraying direction of the nozzle 101 is close to the tangent direction of the filter barrel 91. Since the filter mechanism is set at a small angle with the horizontal plane, the water pressure and the gravity force act on the surface of the filtering barrel to increase the impact force of driving the filter mechanism.

Further, the filtering self-cleaning mechanism 10 comprises a blade 94 mounted on the surface of the filtering barrel 91 (refer to FIG. 5), and the blade 94 is set corresponding to the water spraying direction of the nozzle 101 in order to transfer the power of the water flow to drive the filtering mechanism 9 to rotate.

The invention also can use the motor to drive the filtering container to rotate; alternatively can also use the motor drive in combination with spraying at the same time, using the centrifugal force and the impact force of the water flow to clean the filter screen.

The implementation solutions in the above embodiments can be further combined or replaced, and the embodiments merely describe preferred embodiments of the present invention, instead of limiting the concept and the scope of the present invention; without departing from the design concept of the present invention, various variations and improvements made to the technical solutions of the present invention by persons skilled in the art all belong to the protection scope of the present invention.

What is claimed is:

1. A control method in a washing machine having a circulated water treatment function comprising:
    discharging water into a flocculation container after a washing process ends;
    performing a flocculation treatment, wherein the flocculation treatment includes
        first introducing a quantitative flocculant;
        inflooding tap water to flush the quantitative flocculant into the flocculation container;
        stratifying the contents of the flocculation container after stirring for a set time and standing for a set time;
        draining water in a lower layer which contains less flocculation into a filtering container; and
        accumulating the flocculation which is in an upper layer in the flocculation container until a last rinse is completed;
    after performing the flocculation treatment, filtering water by the filtering container, and then discharging water into a water containing drum of the washing machine for rinsing;
    circulating the water repeatedly in the foregoing processing until a last rinse is completed; and
    discharging flocculation generated in the flocculation treatment for circulated water during the last rinsing process and using rinsing water to wash the flocculation container after the rinsing is completed.

2. The control method in a washing machine according to claim 1, comprising:
    discharging waste water into the filtering container; and
    discharging the waste water from the filtering container after cleaning the flocculation container.

3. The control method in a washing machine according to claim 2, wherein the rinsing water completes cleaning the flocculation container, and tap water is inflooded to clean the filtering container.

4. The control method in a washing machine according to claim 1, comprising:
    after the rinsing water completes cleaning the flocculation container, inflooding tap water to clean the filtering container.

5. The control method in a washing machine according to claim 1, wherein, during the circulating water treatment, if the flocculation detected in the flocculation container exceeds an upper limit of a set value, the flocculation treatment is completed, the flocculation is discharged, and a next flocculation treatment for water is carried out.

6. The control method in a washing machine according to claim 5, wherein, the flocculation is discharged while keeping stirring until the discharge ends.

7. The control method in a washing machine according to claim 1, comprising:
    discharging the flocculation while stirring the flocculation until the discharge ends.

8. The control method in a washing machine according to claim 1, comprising:
    determining whether it is needed to add water or not according to a comparison between a detected water level and a set water level after draining treated water into the water containing drum each time.

9. The control method in a washing machine according to claim 1, comprising:
    calculating a dose of the flocculant for the water to be processed by the flocculation treatment according to an amount of detergent, an amount of water intake for washing, and an amount of water in each flocculation treatment.

10. The control method in a washing machine according to claim 1, wherein, after the stratification, water in the lower layer containing less flocculation is discharged into the filtering container, a discharge time is fixed by a setting amount, or calculated according to the dosage of the flocculant and the amount of water in the flocculation treatment, or measured according to a turbidity.

* * * * *